(12) United States Patent
Rabl

(10) Patent No.: US 6,877,366 B2
(45) Date of Patent: Apr. 12, 2005

(54) TEST METHOD FOR AN EXHAUST GAS CATALYTIC CONVERTER AND A CORRESPONDING TESTING DEVICE

(75) Inventor: Hans-Peter Rabl, Kelheim (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/923,649

(22) Filed: Aug. 20, 2004

(65) Prior Publication Data

US 2005/0016266 A1 Jan. 27, 2005

Related U.S. Application Data

(63) Continuation of application No. PCT/DE03/03809, filed on Nov. 18, 2003.

(30) Foreign Application Priority Data

Nov. 21, 2002 (DE) .......................... 102 54 477

(51) Int. Cl.$^7$ ............................. G01M 15/00
(52) U.S. Cl. ....................... 73/112; 73/118.1
(58) Field of Search ............. 73/23.31, 23.32, 73/116, 117.2, 117.3, 118.1, 119 R, 112, 113

(56) References Cited

U.S. PATENT DOCUMENTS

| | | | | |
|---|---|---|---|---|
| 5,431,011 A | * | 7/1995 | Casarella et al. | 60/274 |
| 5,553,450 A | * | 9/1996 | Schnaibel et al. | 60/274 |
| 5,842,339 A | * | 12/1998 | Bush et al. | 60/274 |
| 5,847,271 A | * | 12/1998 | Poublon et al. | 73/118.1 |
| 6,354,269 B1 | | 3/2002 | Saito et al. | 123/436 |

FOREIGN PATENT DOCUMENTS

DE 41 00 397 A1 8/1991 ............. F01N/3/20

* cited by examiner

Primary Examiner—Eric S. McCall
(74) Attorney, Agent, or Firm—Baker Botts L.L.P.

(57) ABSTRACT

A test method for an exhaust gas catalytic converter (8) of an internal combustion engine (1) comprises the steps of: test injection of fuel during the expansion stroke and/or during the exhaust stroke of the internal combustion engine (1), conversion in the exhaust gas catalytic converter (8) of at least a part of the unburned fuel contained in the exhaust gas of the internal combustion engine, determination of the quantity of fuel not converted by the exhaust gas catalytic converter (8) and determination from the quantity of unconverted fuel of the operating capacity of the exhaust gas catalytic converter (8).

16 Claims, 4 Drawing Sheets

TEST METHOD FOR AN EXHAUST GAS CATALYTIC CONVERTER AND A CORRESPONDING TESTING DEVICE

CROSS REFERENCE TO RELATED APPLICATION

This application is a continuation of copending International Application No. PCT/DE03/03809 filed Nov. 18, 2003 which designates the United States, and claims priority to German application no. 102 54 477.8 filed Nov. 21, 2002.

TECHNICAL FIELD OF THE INVENTION

The invention relates to a test method for an exhaust gas catalytic converter.

DESCRIPTION OF THE RELATED ART

In a known test method for an exhaust gas catalytic converter of an internal combustion engine, fuel is injected late during the expansion stroke of the internal combustion engine, whereby the fuel, on account of the late timing of the injection, enters the exhaust gas catalytic converter unburned and is partially converted there in an exothermic chemical-catalytic reaction. This reaction leads to a heating of the exhaust gas catalytic converter, the quantity of heat released reflecting the operating capacity of the exhaust gas catalytic converter. In the known test method, the temperature of the catalytic converter is therefore measured by a separate temperature sensor, in order to determine from said temperature the operating capacity of the exhaust gas catalytic converter.

A first disadvantage of this known test method is the fact that a separate temperature sensor is required for measuring the temperature of the catalytic converter.

A further disadvantage of the known test method results from the thermal inertia of the exhaust gas catalytic converter. Thus, in the known test method, due to the heat capacity of the exhaust gas catalytic converter, the temperature of the catalytic converter increases only gradually, so that meaningful measurement of the temperature of the catalytic converter is not possible until after a period of delay of up to 30 seconds. During this period of delay, an additional injection of fuel is required during the exhaust stroke of the internal combustion engine, as a result of which injection average fuel consumption in the MVEG test cycle is increased by up to 1%.

A similar test method for an exhaust gas catalytic converter of an internal combustion engine is disclosed in DE 41 00 397 C2. Here, fuel is injected during coasting of the internal combustion engine, said fuel entering the exhaust gas catalytic converter unburned and resulting there in corresponding heating, which heating of the exhaust gas catalytic converter represents the operating capacity of the exhaust gas catalytic converter and is therefore measured by a temperature sensor.

A disadvantage of this known test method is therefore likewise the fact that a separate temperature sensor is required for measuring the temperature of the catalytic converter.

Furthermore, a test method relating to an exhaust gas catalytic converter is known from DE 43 02 779 C2, in which test method the injection of fuel likewise takes place during coasting, so that unburned fuel/air mixture enters the exhaust gas catalytic converter. The operating capacity of the exhaust gas catalytic converter is in this case determined optionally by measuring the temperature increase or by measuring the oxygen concentration by means of a lambda probe.

A separate sensor is therefore also needed in this test method to determine the operating capacity of the exhaust gas catalytic converter.

SUMMARY OF THE INVENTION

The object of the invention is therefore to determine the operating capacity of an exhaust gas catalytic converter without a separate temperature sensor, without substantially increasing fuel consumption.

This object can be achieved by a test method for an exhaust gas catalytic converter of an internal combustion engine comprising the steps of:

Test injection of fuel during the expansion stroke and/or during the exhaust stroke of the internal combustion engine, Conversion in the exhaust gas catalytic converter of at least a part of the unburned fuel contained in the exhaust gas of the internal combustion engine, Exhaust gas recirculation of exhaust gas removed downstream of the exhaust gas catalytic converter, together with the unconverted fuel from the test injection, into an intake manifold of the internal combustion engine, Determination of the increase in power of the internal combustion engine, which increase results from the exhaust gas recirculation of the unconverted fuel, Determination of the quantity of unconverted fuel in the exhaust gas catalytic converter from the increase in power of the internal combustion engine, Determination of the operating capacity of the exhaust gas catalytic converter from the quantity of unconverted fuel.

The test method may further comprise the steps of determining the angular acceleration of the internal combustion engine; and, determining from the angular acceleration of the internal combustion engine the increase in power resulting from the test injection. In the test injection a predetermined quantity of fuel can be injected and the operating capacity of the exhaust gas catalytic converter dependent on the quantity of fuel injected can be determined. The exhaust gas recirculation rate can be determined and the operating capacity of the exhaust gas catalytic converter dependent on the exhaust gas recirculation rate can be determined. The operating capacity of the exhaust gas catalytic converter at various temperatures can also be determined. The temperature at which the conversion quantity of the exhaust gas catalytic converter essentially corresponds to a predetermined threshold value can be determined.

The object can also be achieved by a testing device for an exhaust gas catalytic converter of an internal combustion engine comprising an injection system for the test injection of a predetermined quantity of fuel during an expansion stroke and/or during an exhaust stroke of the internal combustion engine, an exhaust gas recirculation device for removing exhaust gas from the exhaust gas flow of the internal combustion engine downstream of the exhaust gas catalytic converter and for recirculating the removed exhaust gas into an intake manifold located upstream of the internal combustion engine, a measuring device for recording the increase in power of the internal combustion engine caused by the test injection, and an evaluation unit for determining the operating capacity of the exhaust gas catalytic converter dependent on the quantity of fuel injected and the resulting increase in power.

A temperature sensor connected to the evaluation unit can be provided for measuring the temperature of the exhaust gas catalytic converter. The measuring device for determining the increase in power of the internal combustion engine may have a rotational speed sensor. The measuring device for determining the increase in power of the internal combustion engine may have a rotational speed sensor.

The invention embraces the general technical theory of determining the operating capacity of the exhaust gas catalytic converter with the internal combustion engine in a diagnostic or testing mode and not operating normally.

Here, a test injection of fuel occurs during the expansion stroke and/or during the exhaust stroke of the internal combustion engine, so that the injected fuel enters the exhaust gas catalytic converter unburned. In a test injection during the expansion stroke of the internal combustion engine, the test injection preferably occurs at a crankshaft angle in the range from 90° to 180° after the top dead center, in order to prevent burning of the injected fuel.

In this case, part of the unburned fuel is converted in the exhaust gas catalytic converter in accordance with the operating capacity of the exhaust gas catalytic converter, while the remaining part of the unburned fuel leaves the exhaust gas catalytic converter again. The quantity of fuel contained in the exhaust gas flow downstream of the exhaust gas catalytic converter thus reflects the operating capacity of the exhaust gas catalytic converter.

As part of the test method according to the invention, the quantity of fuel which is not converted in the exhaust gas catalytic converter and which therefore reemerges from the exhaust gas catalytic converter is therefore determined.

The operating capacity of the exhaust gas catalytic converter is then determined according to this quantity of fuel. Here, a small quantity of unconverted fuel is a sign of a soundly functioning exhaust gas catalytic converter with a high conversion rate, whereas a large quantity of unconverted fuel and of fuel allowed to pass through by the exhaust gas catalytic converter is evidence of a poorly functioning exhaust gas catalytic converter.

As part of the test method according to the invention, the exhaust gas is preferably recirculated in order to determine the quantity of fuel which has not been converted by the exhaust gas catalytic converter. Here, exhaust gas containing unburned and unconverted fuel is removed from the flow of exhaust gas from the internal combustion engine downstream of the exhaust gas catalytic converter and fed back into the intake manifold of the internal combustion engine. This exhaust gas recirculation of unburned fuel causes through the additional supply of fuel an increase in the power of the internal combustion engine and thus indirectly enables determination of the quantity of fuel which is allowed to pass through by the exhaust gas catalytic converter.

In order to determine the increase in power of the internal combustion engine brought about by the test injection, the angular acceleration of the crankshaft, from which angular acceleration the torque of the internal combustion engine can be derived, is preferably determined.

The angular acceleration of the crankshaft can be determined within the scope of the invention by double temporal differentiation of the rotational speed of the crankshaft, it being possible for the rotational speed of the crankshaft to be determined for example by a rotational speed sensor.

Alternatively, however, it is also possible for a speed sensor to be provided which measures the speed of rotation of the crankshaft. The angular acceleration of the crankshaft is then arrived at by single temporal differentiation of the measured speed of rotation.

Over and above this, the angular acceleration of the crankshaft can also be measured directly by an acceleration sensor so that no temporal differentiation is required in order to determine the angular acceleration.

Finally, the option also exists of deriving the angular acceleration of the crankshaft from other operating variables of the internal combustion engine such as, for example, the number of revolutions, the speed of rotation or the angular acceleration of the camshaft or of another shaft which is rigidly coupled to the crankshaft.

The increase in power of the internal combustion engine brought about by the test injection is, however, determined not only by the quantity of unburned fuel which leaves the exhaust gas catalytic converter, but also by the exhaust gas recirculation rate. If, for example, only a small proportion of the exhaust gas containing the unburned fuel is fed back to the intake manifold of the internal combustion engine, even a poor conversion rate of the exhaust gas catalytic converter with a correspondingly large quantity of unburned fuel in the exhaust gas flow causes only a limited increase in the power of the internal combustion engine. In order to take account of this effect, the exhaust gas recirculation rate is therefore preferably also set or determined and taken into account when determining the operating capacity of the exhaust gas catalytic converter.

In addition to this, the test method according to the invention also makes it possible to determine the light-off temperature of the exhaust gas catalytic converter, that is, the temperature of the catalytic converter at which said converter reaches 50% of its nominal conversion rate. To this end, the test method described above is performed at various temperatures, whereby in each case the conversion rate of the exhaust gas catalytic converter is determined and compared with the predetermined nominal conversion rate. When approximately 50% of the nominal conversion rate is reached, the current temperature value is fixed as the light-off temperature and stored, for example in the electronic engine control.

Determination of the light-off temperature of the exhaust gas catalytic converter preferably takes place upon cold-starting of the internal combustion engine, when the temperature of the catalytic converter, starting from the relatively low ambient temperature, passes through a large temperature range.

The determination required in this case of the particular temperature of the catalytic converter can be carried out for example by a temperature sensor which measures the temperature of the catalytic converter directly.

Alternatively, however, it is also possible for the temperature of the catalytic converter to be derived, in accordance with a predetermined physical model, from other known variables of the drive system so that a separate temperature sensor for measuring the temperature of the catalytic converter can be dispensed with.

Knowledge of the light-off temperature makes it possible, when the internal combustion engine is running normally, for active catalytic-converter heating measures to be initiated as required, so as to bring the exhaust gas catalytic converter as quickly as possible to operating temperature.

In addition to this, conclusions can be drawn from the light-off temperature of the exhaust gas catalytic converter as to the ageing status and any possible damage to the exhaust gas catalytic converter, since the light-off temperature of an exhaust gas catalytic converter in operation can shift due to ageing effects.

In a variant of the invention, the test method according to the invention is in each case carried out only for one combustion chamber of the internal combustion engine, so that disruptive interactions with the recirculation of exhaust gases from other combustion chambers can be ruled out.

Another variant of the invention, by contrast, provides that the test injection be carried out in several combustion chambers of the internal combustion engine. The assignment of a test injection in a particular combustion chamber of the internal combustion engine to the resulting increase in power is then made, taking into account the transit time of the exhaust gas in the exhaust gas recirculation. By this means, all the exhaust gas catalytic converters of the internal combustion engine which are connected in parallel can be checked within a few revolutions of the crankshaft.

The method according to the invention can be applied inter alia in spark ignition (Otto) engines and diesel engines, but the invention is not restricted to these types of internal combustion engine. The method according to the invention is, however, preferably employed in a common-rail injection system of a diesel engine.

Finally, the invention also comprises an appropriate testing device for implementing the test method according to the invention.

BRIEF DESCRIPTION OF THE DRAWINGS

Other advantageous developments of the invention are contained in the subclaims or are illustrated below together with the description of the preferred embodiment of the invention with reference to the drawings, in which:

DETAILED DESCRIPTION OF THE PREFERRED EMBODIMENTS

Figure 1:
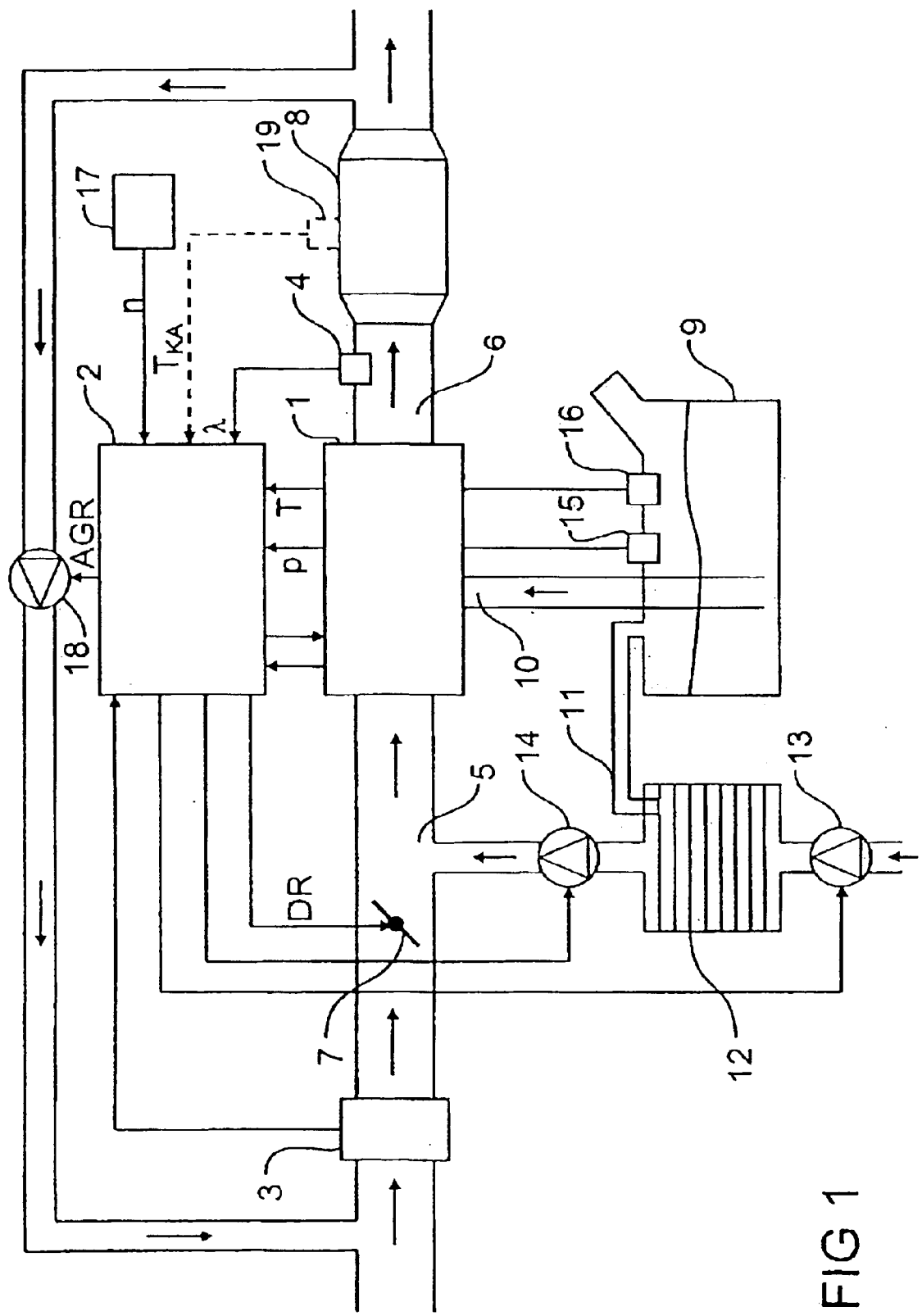
FIG. 1 shows a drive system for a motor vehicle with an internal combustion engine and an exhaust gas catalytic converter.

The representation in FIG. 1 shows an internal combustion engine 1 with an injection system, the internal combustion engine 1 being constructed in a conventional manner and therefore shown only schematically.

The internal combustion engine 1 is controlled by an electronic control unit 2, the control unit 2 predetermining for example the time and duration of injection by the injection system.

The control unit 2 evaluates the measurement signals of an air-mass sensor 3 and of a lambda probe 4 as input signals, the air-mass sensor 3 being arranged in an intake manifold 5 of the internal combustion engine 1, while the lambda probe 4 is located on the outlet side of the internal combustion engine 1 in an exhaust-gas duct 6.

In addition, a throttle valve 7 is also arranged in the intake manifold 5 of the internal combustion engine 1, said throttle valve controlling the air-mass flow drawn in by the internal combustion engine 1 and being adjusted by the control unit 2.

Furthermore, an exhaust gas catalytic converter 8 is arranged in the exhaust-gas duct 6, said exhaust gas catalytic converter being designed as a conventional three-way catalytic converter.

A fuel tank 9 is provided for supplying fuel, said fuel tank being connected to the internal combustion engine 1 via a fuel line 10 which is shown only schematically.

Over and above that, the fuel tank 9 has a vent line 11 which discharges into an activated carbon filter 12, the activated carbon filter 12 being able to store temporarily the fuel fumes blowing from the fuel tank 9. This prevents fuel fumes blowing from the fuel tank 9 from escaping, which would lead to environmental pollution.

The activated carbon filter 12 has, however, only limited storage capacity and therefore has occasionally to be purged with ambient air in order to flush the stored fuel out of the activated carbon filter 12. The activated carbon filter 12 is therefore connected via a controllable valve 13 to the ambient environment, the valve 13 being controlled by the control unit 2. In addition, the activated carbon filter 12 is connected via a controllable valve 14 to the intake manifold 5 of the internal combustion engine 1.

When the valves 13 and 14 are open, the internal combustion engine 1 therefore draws in ambient air via the activated carbon filter 12, the fuel fumes stored in the activated carbon filter 12 being flushed out and thereby slightly enriching the mixture in the intake manifold 5 of the internal combustion engine 1, which is measured by the lambda probe 4. In order to purge the activated carbon filter 12, the two valves 13 and 14 are therefore opened until the lambda probe 4 measures no further enrichment of the mixture in the intake manifold 5, as all the fuel fumes will then have been flushed out of the activated carbon filter 12 and the storage capacity of the activated carbon filter 12 consequently restored.

During the purging of the activated carbon filter 12, the volumetric efficiency of the internal combustion engine 1 is increased by the fuel vapors flushed out of the activated carbon filter 12 and this brings about an increase in power. The control unit 2, however, compensates for this disruptive influence of the regeneration of the activated carbon filter 12 by adjusting the throttle valve 7 and changing the ignition angle. In so doing, the control unit 2 takes into account the air ratio λ measured by the lambda probe 4 in accordance with a predetermined physical model, which also includes the valve characteristic curve, stored in a characteristic-curve element, of the valve 14.

In addition, the fuel tank 9 has a pressure sensor 15 which measures the pressure in the fuel tank 9 and, in order to evaluate the measurement signal, is connected to the control unit 2.

Furthermore, there is also a temperature sensor 16 arranged in the fuel tank 9, said temperature sensor measuring the fuel temperature and forwarding the measurement to the control unit 2. This advantageously enables the fuel temperature to be taken into account when determining the fuel quality from the blowing action, thereby preventing temperature-caused measurement errors.

The drive system also has a rotational speed sensor 17 which measures the number of revolutions n of the crankshaft of the internal combustion engine 1 and forwards this measurement to the control unit 2. The control unit 2 then computes by double temporal differentiation from the measured number of revolutions n of the crankshaft the angular acceleration a of the crankshaft.

Over and above this, the drive system has an exhaust gas recirculation, which removes exhaust gas downstream of the exhaust gas catalytic converter 8 and recirculates it via a controllable exhaust gas recirculation valve 18 into the intake manifold 5 of the internal combustion engine 1 upstream of the air-mass sensor 3. The exhaust gas recirculation valve 18 is controlled here by the control unit 2, which enables adjustment of the exhaust gas recirculation rate EGR.

The control unit 2 makes it possible here to determine the temperature of the catalytic converter $T_{Cat}$ in accordance with a predetermined physical model consisting of known operating variables of the drive system.

In an alternative variant of the invention, the drive system has in contrast a temperature sensor 19 which measures the temperature of the catalytic converter $T_{Cat}$ directly, this being substantially more precise.

Figure 2A:
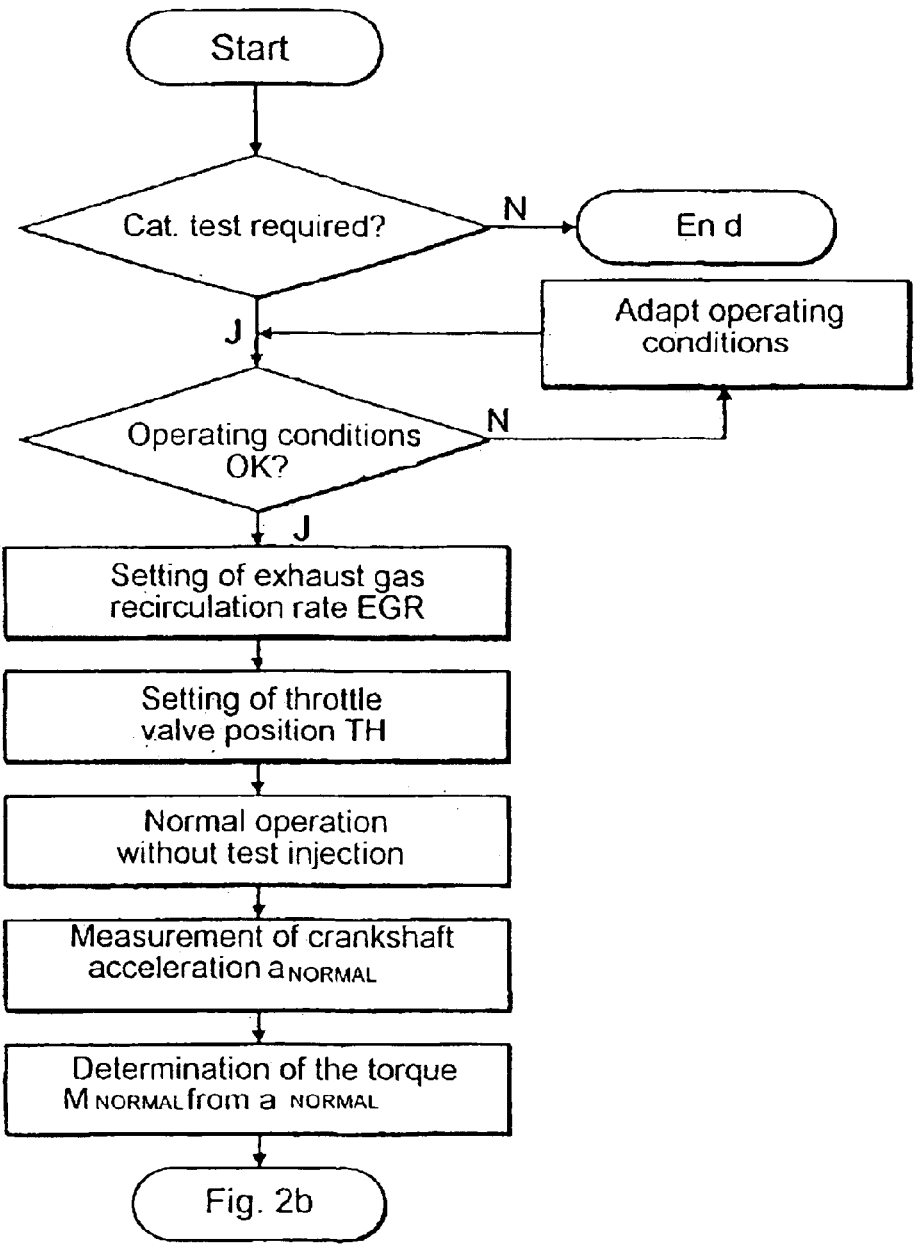
FIGS. 2a and 2b show a test method for the exhaust gas catalytic converter in FIG. 1.

The test method according to the invention will now be described below for the exhaust gas catalytic converter 8, said method being represented in FIGS. 2a and 2b as a flow diagram.

At the start of the test method according to the invention, a check is first made to ascertain whether an inspection of the operating capacity of the exhaust gas catalytic converter 8 is required. This may be the case for example after the expiry of specified time intervals or each time a predetermined driving distance has been covered. If no inspection of the exhaust gas catalytic converter 8 is required, then the test method according to the invention is cancelled.

Otherwise, a check is made in a next step as to whether the operating conditions are suitable for implementing the test method according to the invention. For example, the test method according to the invention requires a predetermined injection pressure.

If the operating conditions are unsuitable, then in a further step the operating conditions are adapted until finally operating conditions apply which are suitable for the test method according to the invention.

In a next step, the exhaust gas recirculation rate EGR is set to a predetermined value of, for example, 50%, the control unit 2 controlling the exhaust gas recirculation valve 18 accordingly. An exhaust gas recirculation rate EGR of 50% means that the percentage proportion by volume of exhaust gas in the unburned mixture equals 50.

In addition, a predetermined throttle valve position DR is then set, the control unit 2 controlling the throttle valve 7 accordingly.

Normal injection operation of the internal combustion engine 1 then takes place, a predetermined quantity of fuel $m_{NORMAL}$ being injected in each case.

At the same time, the acceleration of the crankshaft $a_{NORMAL}$ is derived from the measured number of revolutions n of the crankshaft.

From the acceleration of the crankshaft $a_{NORMAL}$ the torque $M_{NORMAL}$ which is applied in normal injection operations and which acts upon the crankshaft of the internal combustion engine 1 is then calculated.

Figure 2B:
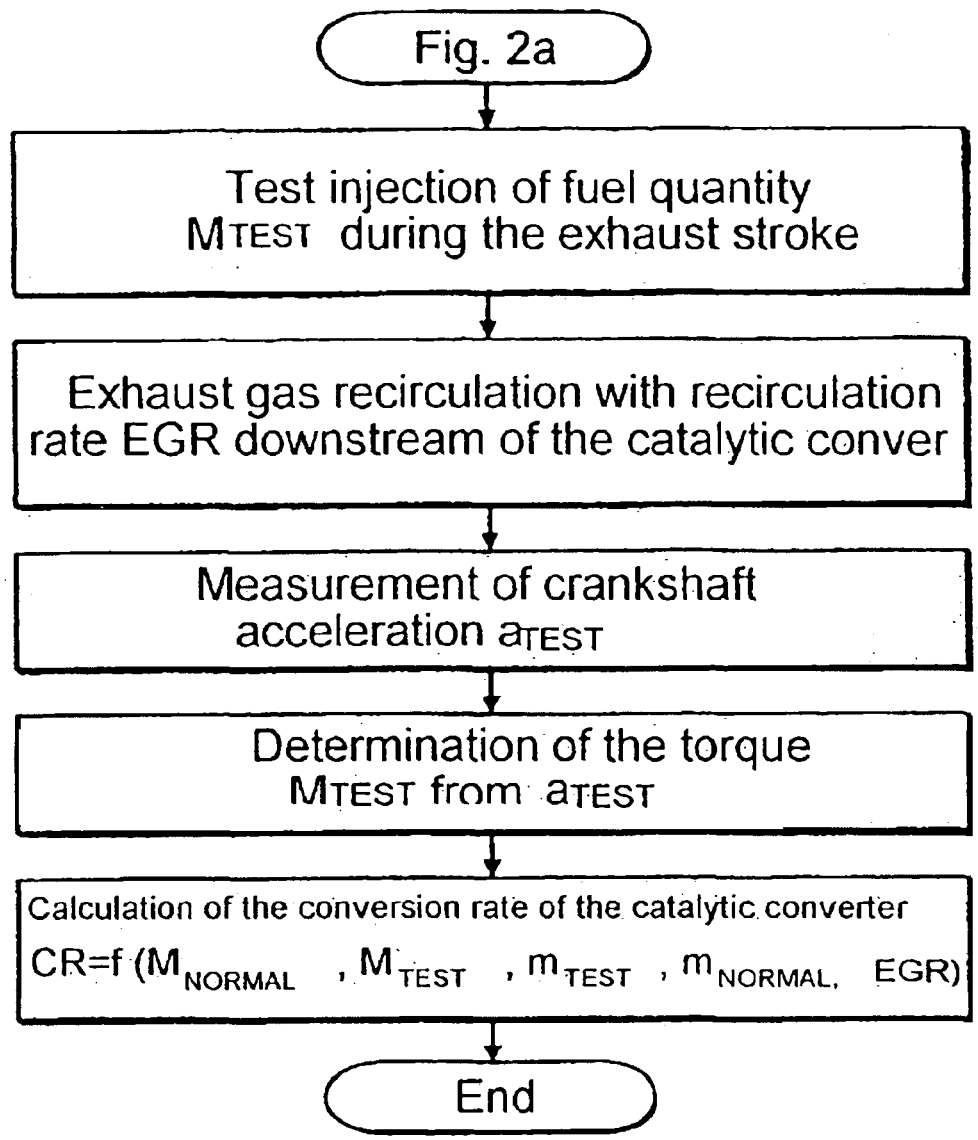

In the section of the method represented in FIG. 2b, a test injection is then carried out in addition to the normal injection during the exhaust stroke of the internal combustion engine 1. Here, a predetermined quantity of fuel $m_{TEST}$ is injected in each case, which fuel quantity enters the exhaust gas catalytic converter 8 unburned because of the very late injection time and is partially converted there at a conversion rate CR. A proportion $CR \cdot m_{TEST}$ of the injected fuel is thus converted in the exhaust gas catalytic converter 8, while the remaining proportion $(1-CR) \cdot m_{TEST}$ passes through the exhaust gas catalytic converter 8 such that the exhaust gas flow downstream of the exhaust gas catalytic converter 8 still contains unburned fuel.

By means of the exhaust gas recirculation, a proportion $EGR \cdot (1-CR) \cdot m_{TEST}$ of the unburned fuel is then fed back into the intake manifold 5 of the internal combustion engine 1 upstream of the air-mass sensor 3, so that the total quantity of fuel $m_{TOTAL}$ is calculated as follows:

$$m_{TOTAL} = m_{NORMAL} + EGR \cdot (1-CR) \cdot m_{TEST}$$

The increased quantity of fuel $m_{TOTAL}$ as a result of the test injection in conjunction with the exhaust gas recirculation leads to a corresponding increase in engine power, which is reflected in a correspondingly greater acceleration of the crankshaft. The control unit 2 derives therefore from the number of revolutions of the crankshaft measured by the rotational speed sensor 17 the acceleration of the crankshaft $a_{TEST}$ which occurs when the test injection takes place.

From the crankshaft acceleration $a_{TEST}$ the corresponding torque $M_{TEST}$ which the internal combustion engine 1 applies to the crankshaft is then calculated.

The conversion rate CR of the exhaust gas catalytic converter 8 is then arrived at from the exhaust gas recirculation rate EGR, the torque $M_{NORMAL}$ and the quantity of fuel injected $m_{NORMAL}$ in normal operation and from the torque $M_{TEST}$ and the additional quantity of fuel injected $m_{TEST}$ in test operation in accordance with the following formula:

$$CR = 1 - \left(\frac{M_{TEST}}{M_{NORMAL}} - 1\right) \cdot \frac{1}{EGR} \cdot \frac{m_{NORMAL}}{m_{TEST}}.$$

Given a normal quantity of fuel injected of $m_{NORMAL}=4$ mg/stroke, a subsequent quantity of fuel injected of $m_{TEST}=4$ mg/stroke, an exhaust gas recirculation rate of EGR=0.5 and an increase in torque in test operation of 20% corresponding to $M_{TEST}/M_{NORMAL}=1.2$, a conversion rate of the exhaust gas catalytic converter 8 of CR=0.6 is thus arrived at.

Figure 3:
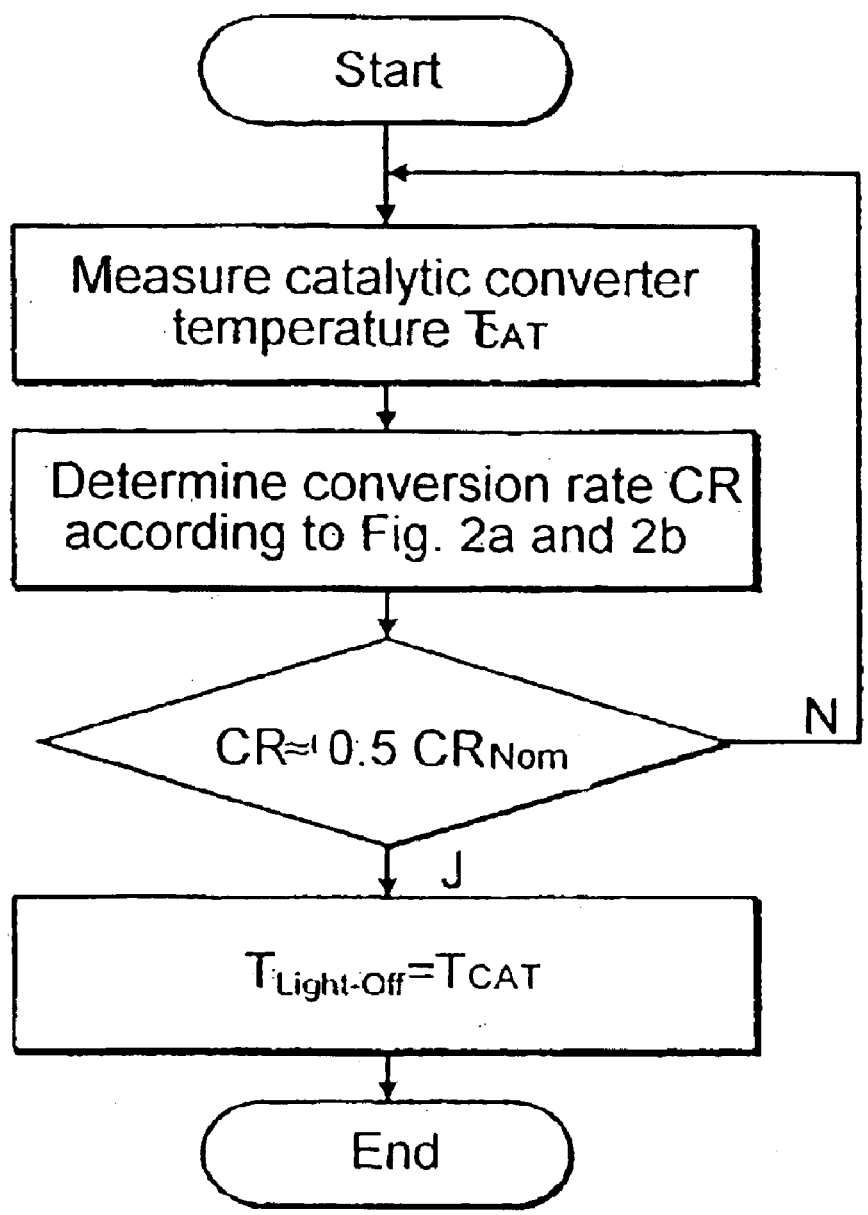
FIG. 3 shows a variant of the test method according to the invention for determining the light-off temperature of the exhaust gas catalytic converter.

Finally, the flowchart in FIG. 3 shows a variant of the test method according to the invention in which the light-off temperature $T_{Light-off}$ of the exhaust gas catalytic converter is determined. This is the temperature of the catalytic converter at which the conversion rate CR of the exhaust gas catalytic converter 8 has reached 50% of the nominal conversion rate $CR_{Norm}$.

To this end, the temperature of the catalytic converter $T_{Cat}$ is measured at regular intervals when the engine is being cold-started, the conversion rate CR being determined in each case in accordance with the test method described above.

The conversion rate CR is then compared with a predetermined nominal value $CR_{Norm}$ of the conversion rate in order to determine the light-off temperature $T_{Light-off}$ of the exhaust gas catalytic converter. When 50% of the predetermined nominal value $CR_{Norm}$ has been reached, the current temperature of the catalytic converter $T_{Cat}$ is stored as the light-off temperature $T_{Light-Off}$ in the control unit 2.

The invention is not restricted to the preferred embodiment described above. Rather, a large number of variants and modifications are possible which also make use of the inventive idea and therefore fall within the scope of the invention.

I claim:

1. A test method for an exhaust gas catalytic converter of an internal combustion engine comprising the steps of:

Test injection of fuel during the expansion stroke and/or during the exhaust stroke of the internal combustion engine, Conversion in the exhaust gas catalytic converter of at least a part of the unburned fuel contained in the exhaust gas of the internal combustion engine, Exhaust gas recirculation of exhaust gas removed downstream of the exhaust gas catalytic converter, together with the unconverted fuel from the test injection, into an intake manifold of the internal combustion engine, Determination of the increase in power of the internal combustion engine, which increase results from the exhaust gas recirculation of the unconverted fuel, Determination of the quantity of unconverted fuel in the exhaust gas catalytic converter from the increase in power of the internal combustion engine, and Determination of the operating capacity of the exhaust gas catalytic converter from the quantity of unconverted fuel.

2. The test method according to claim 1, comprising the steps of:

Determination of the angular acceleration of the internal combustion engine; and Determination from the angular acceleration of the internal combustion engine of the increase in power resulting from the test injection.

3. The test method according to claim 1, wherein in the test injection a predetermined quantity of fuel is injected and the operating capacity of the exhaust gas catalytic converter dependent on the quantity of fuel injected is determined.

4. The test method according to claim 1, wherein the exhaust gas recirculation rate is determined and the operating capacity of the exhaust gas catalytic converter dependent on the exhaust gas recirculation rate is determined.

5. The test method according to claim 1, wherein the operating capacity of the exhaust gas catalytic converter at various temperatures is determined.

6. The test method according to claim 1, wherein the temperature at which the conversion quantity of the exhaust gas catalytic converter essentially corresponds to a predetermined threshold value is determined.

7. A testing device for an exhaust gas catalytic converter of an internal combustion engine comprising:

an injection system for the test injection of a predetermined quantity of fuel during an expansion stroke and/or during an exhaust stroke of the internal combustion engine, an exhaust gas recirculation device for removing exhaust gas from the exhaust gas flow of the internal combustion engine downstream of the exhaust gas catalytic converter and for recirculating the removed exhaust gas into an intake manifold located upstream of the internal combustion engine, a measuring device for recording the increase in power of the internal combustion engine caused by the test injection, and an evaluation unit for determining the operating capacity of the exhaust gas catalytic converter dependent on the quantity of fuel injected and the resulting increase in power.

8. The testing device according to claim 7, wherein a temperature sensor connected to the evaluation unit is provided for measuring the temperature of the exhaust gas catalytic converter.

9. The testing device according to claim 7, wherein the measuring device for determining the increase in power of the internal combustion engine has a rotational speed sensor.

10. The testing device according to claim 8, wherein the measuring device for determining the increase in power of the internal combustion engine has a rotational speed sensor.

11. A test method for an exhaust gas catalytic converter of an internal combustion engine comprising the steps of:

Injecting fuel during the expansion stroke and/or during the exhaust stroke of the internal combustion engine, Converting in the exhaust gas catalytic converter of at least a part of the unburned fuel contained in the exhaust gas of the internal combustion engine, Recirculating exhaust gas removed downstream of the exhaust gas catalytic converter, together with the unconverted fuel from the test injection, into an intake manifold of the internal combustion engine, Determining the increase in power of the internal combustion engine, which increase results from the exhaust gas recirculation of the unconverted fuel, Determining the quantity of unconverted fuel in the exhaust gas catalytic converter from the increase in power of the internal combustion engine, and Determining the operating capacity of the exhaust gas catalytic converter from the quantity of unconverted fuel.

12. The test method according to claim 11, comprising the steps of:

Determining the angular acceleration of the internal combustion engine; and

Determining the increase in power from the angular acceleration of the internal combustion engine resulting from the test injection.

13. The test method according to claim 11, wherein in the test injection a predetermined quantity of fuel is injected and the operating capacity of the exhaust gas catalytic converter dependent on the quantity of fuel injected is determined.

14. The test method according to claim 11, wherein the exhaust gas recirculation rate is determined and the operating capacity of the exhaust gas catalytic converter dependent on the exhaust gas recirculation rate is determined.

15. The test method according to claim 11, wherein the operating capacity of the exhaust gas catalytic converter at various temperatures is determined.

16. The test method according to claim 11, wherein the temperature at which the conversion quantity of the exhaust gas catalytic converter essentially corresponds to a predetermined threshold value is determined.

* * * * *